United States Patent [19]

Jachimowicz

[11] 4,450,246

[45] May 22, 1984

[54] NOVEL POLYURETHANE CATALYSTS IN POLYURETHANE FOAM PROCESS

[75] Inventor: Felek Jachimowicz, Columbia, Md.

[73] Assignee: W. R. Grace & Co., New York, N.Y.

[21] Appl. No.: 436,814

[22] Filed: Oct. 26, 1982

[51] Int. Cl.³ .................... C08G 18/14; C08G 18/18
[52] U.S. Cl. .................................. 521/129; 521/130; 528/53; 564/503
[58] Field of Search ............................... 521/129, 130

[56] References Cited

U.S. PATENT DOCUMENTS

| | | | |
|---|---|---|---|
| 3,136,731 | 6/1964 | Piechota et al. | 260/2.5 |
| 3,320,190 | 5/1967 | Allport et al. | 521/129 |
| 3,476,933 | 11/1969 | Mendelsohn | 260/2.5 |
| 3,769,244 | 10/1973 | Hashimoto et al. | 521/129 |
| 4,165,412 | 8/1979 | Bechara et al. | 521/129 |

FOREIGN PATENT DOCUMENTS

2363324 7/1974 Fed. Rep. of Germany .
2947648 8/1981 Fed. Rep. of Germany .

OTHER PUBLICATIONS

Jachimowicz et al., Jour. Org. Chem. 47, No. 1, pp. 445–447, (1982).
Plastic Technology, vol. 24, No. 13, (1978), pp. 57–62.
Plastics & Rubber Processing, vol. 2, No. 1, (1977), pp. 30–32.
Jour. Org. Chem. 47, 445, (1982).
Rowton, Jour. Cellular Plastics, 16, 27–35, (1980).

*Primary Examiner*—H. S. Cockeram
*Attorney, Agent, or Firm*—Howard J. Troffkin

[57] ABSTRACT

A process for producing a polyurethane foam by reacting an organic polyisocyanate with an organic polyester polyol or polyether polyol in the presence of a catalytic amount of specific amine compounds of the formula:

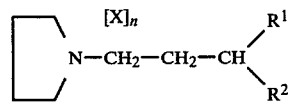

or

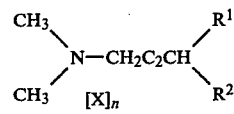

wherein $R^1$ is a methyl or ethyl and $R^2$ is hydrogen or methyl such that when $R^1$ is methyl, $R^2$ is methyl and when $R^1$ is ethyl, $R^2$ is hydrogen, X is an organic mono or dicarboxylic acid and n is an integer from 0 to 1.

19 Claims, No Drawings

NOVEL POLYURETHANE CATALYSTS IN POLYURETHANE FOAM PROCESS

BACKGROUND OF THE INVENTION

This invention pertains to the field of urethane catalysts. More particularly, this invention relates to the use of certain specific amine compounds as urethane catalysts.

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain-extending isocyanate-hydroxyl reaction by which a hydroxyl-containing molecule is reacted with an isocyanate-containing molecule to form a urethane. This increases the viscosity of the mixture and provides a polyurethane containing secondary nitrogen atoms in the urethane groups. A second reaction is a cross-linking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of foam. This third reaction is not essential if an extraneous blowing agent, such as a halogenated, normally liquid hydrocarbon, carbon dioxide, etc., is employed, but is essential if all or even part of the gas for foam generation is to be generated by this in situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

Many of the catalysts used today are tertiary mono and di-amines. Among these are N,N,N',N'-tetramethylethylene diamine, N,N-dimethyl, cyclohexylamine, N-methylmorpholine and the highly used bis(2-dimethylaminoethyl) ether, N-methyldicyclohexyl amine and 1,4-diazabicyclo [2.2.2] octane ("triethylene diamine"). Other typical amines used in forming polyurethanes are described in U.S. Pat. Nos. 4,012,445; 3,925,268; 3,786,005; 4,001,223; 4,048,107; 4,038,210; 4,033,911; 4,026,840; 4,022,720 and 3,912,689.

Some of the presently used tertiary amines leave a residue in the foam and thereby impart an undesirable odor to the resultant product. Still further, certain catalytic compounds, especially the alkyl tertiary amines, which meet specifications in the area of odor do not yield foams within desired tack-free time due to their low activity. The need for rapid gel, tack-free and final cure times are required in the formation of foam products in many of today's processing operations.

Commercial production of urethane foams, especially flexible foams, has undergone major change from production of domed buns to flat-top buns. Conventional domed buns normally require trimming and removal of the "dome" which translates into a 15 to 20% loss of product. Moreover, foam density and uniformity often vary and finishing costs of such domed buns makes such processing less desirable than the newer flat-top bun process as is described in *Plastic Technology*, Vol. 24, No. 13, pages 57–62, 1978 and in *Plastics and Rubber Processing* Vol. 2, No.1 1, pages 30–32, 1977, said description incorporated herein by reference.

Processing designs associated with achieving flat-top buns have placed increased demands on the chemistry of polyurethanes, particularly those related to the catalysts necessary to provide a proper balance in polymerization and blowing. It is necessary for the catalyst material or system to be capable of exhibiting a reactivity profile comprised of delayed creaming, delayed and controlled gellation/polymerization, controllable rise and rapid cure. Stated another way, the catalyst must permit gelation or viscosity build-up not to occur too quickly. Should this occur, there would be increased stress placed on the foam possibly causing splitting and/or cell collapse. Therefore, delayed action catalyst is desired since it causes less strain on the forming foam and facilitates molding the rising bun into a square shape. The foam must form in a moderate, uniform manner. Moreover, despite the slower cream and moderate rise time, the tack-free time must be suitable to permit handling of the foam in short time periods as well as to improve the physical properties of the resultant foam.

It is greatly desired to have a catalyst for forming foam polyurethanes which does not result in a product having malicious odor from the residue catalyst, which provides for the formation of a substantially uniform foam, which is capable of providing a suitable reaction profile for normal processing which produces a uniform, odor-free foam, which is capable of providing a reaction profile that is compatible with the requirements of the flat-top bun process and which is capable of forming tack-free products within a very short period of time.

SUMMARY OF THE INVENTION

The present invention is directed to the use of a specific class of tertiary amine compounds which have unexpectedly been found to provide polyurethane foam products not having malicious odor, to provide reaction profile suitable for flat-top bun processing and conventional processing and to provide foams which can be formed from conventional polyisocyanates and polyols in an accelerated manner and provide equivalent or better foam properties.

Specifically, the subject invention is directed to catalysts and a process for forming a polyurethane foam product by reacting a polyisocyanate with a polyol in the presence of a catalytic amount of a specific class of amine compound selected from dimethyl isoanylamine, dimethyl-n-amylamine, isoamyl pyrrolidine, n-amyl pyrrolidine or their carboxylic acid salts.

DETAILED DESCRIPTION OF THE INVENTION

The process of the subject invention is directed to the formation of foams, especially flexible foams, by the reaction of a polyisocyanate with a polyol in the presence of one or a mixture of amine compounds of the general formula:

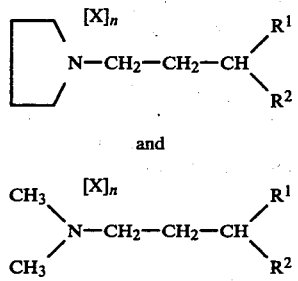

and wherein R¹ is a methyl or ethyl and R² is hydrogen or methyl such that when R¹ is ethyl, R² is hydrogen and when R¹ is methyl, R² is methyl. X represents an amine salt forming agent such as a $C_1$–$C_{12}$ mono or dibasic aliphatic or aromatic carboxylic acid such as, for example formic, acetic, valeric, hexanoic, adipic, glutaric, maleic, fumaric acid, benzoic acid and the like; and n is a number of from 0 to 1. When used as a catalyst component in forming domed buns by conventional modes it is preferred to use the free tertiary amine (n equals 0) or a mixture having very little salt (n being from 0 to 0.25). When using flat-top bun process it is preferred that a substantial portion of the amine be in salt form (n being up to 1 and preferably from about 0.5 to about 1). The above compounds forming the specific class of amines of the present invention unexpectedly found to provide uniquely superior catalytic activity and foam product are the n-amyl and isoamyl derivatives of pyrrolidine and of dimethylamine. The other $C_5$ alkyl isomers (those substituted in the alpha and/or beta carbon of the alkyl group) of pyrrolidine and of dimethylamine do not exhibit the desired combination of properties, especially of catalytic activity.

The compounds herein described possess a number of useful characteristics making them exceptionally attractive as polyurethane catalysts. For example, they have rapid catalytic activity in the polyurethane foam area. The compounds, especially in the form of amine salts, are capable of exhibiting good reaction profile to be a suitable catalyst in flat-top bun processes. The catalysts of the invention are particularly desirable in foaming urethanes in that they provide a sufficient delay in the foaming operation to aid in processing. Yet the catalysts also give good foams within desirable tack-free times. This delay time is particularly desirable in molding applications to allow sufficient time to situate the prefoam mix in the mold. The present catalysts are also attractive because they are unexpectedly capable of being retained in the mixture while foaming occurs to yield a substantially uniform foam yet do not remain in the resultant product to impart undesired odor. In addition, the compounds are easily prepared and thus provide a relatively inexpensive, cost effective catalyst material.

The subject catalyst compounds can be readily formed by conventional synthetic techniques involving the reaction of dimethyl amine or pyrrolidine with n-pentanol or 3 methyl butanol or n-amylhalide or isoamylhalide. The subject catalyst compounds can also be formed by conventional catalyzed aminomethylation reactions (See Journal of Organic Chemistry, 47, 445 (1982)) of dimethylamine or pyrrolidine with the corresponding $C_4$ monoolefin hydrocarbon in the presence of hydrogen or water, carbon monoxide and suitable catalyst.

To prepare polyurethane foams using the present catalyst, any aromatic or aliphatic polyisocyanate may be used. Typical aromatic polyisocyanates include m-phenylene diisocyanate, p-phenylene diisocyanate, methylene, polymethylene diisocyanate, polyphenylisocyante, diphenylisocyanate 2,4-toluene diisocyante, 2,6-tolulene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl) methane, bis(3-methyl-4-isocyanatophenyl) methane, and 4,4'-diphenylpropane diisocyanate. Aliphatic and cycloaliphatic polyisocyanates include methylene diisocyanate, hexamethylene diisocyanate, 2,2,4-trimethyl-hexamethylene diisocyanate, 2,4,4-trimethyl-hexamethylene diisocyanate, 4,4'-dicyclohexyl methane diisocyanate, isophorone diisocyanate or 3,5,5-trimethylcyclohexyl isocyanate and the like.

Preferred polyisocyanates used in the practice of the invention the aromatic polyisocyanates and, in particular, are, 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

The hydroxyl-containing polyol component which reacts with the isocyanate may suitably be a polyester polyol or a polyether polyol having a hydroxyl number ranging from about 700 to about 25, or lower. Flexible foams are best provided for when the hydroxyl number is in the range from about 25 to 60. Semi-flexible foams can be formed by using a polyol with a hydroxyl number of from about 100 to 300. Rigid polyurethanes are formed from polyols with a hydroxyl number of from about 350 to 700.

The subject amine compounds have been unexpectedly found to be a superior catalyst material in the formation of foam products especially flexible and semi-flexible foams. The subject catalysts are especially suitable for forming flexible foams with polyether polyols using a flat-top bun process. The subject catalysts provide substantial cream time with shorter gel and tack-free time while producing foams of good cell structure, tensile properties and stability as attained using the present commercial tertiary amines, such as triethylene diamine, used for forming these products.

When the polyol is a polyester, it is preferable to use a polyester having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups of acetylenic groups. Aromatic or aliphatic acids, such as succinic acid, adipic acid, sebabic acid, azelaic acid, phthalic acid, terephthalic acid, etc., may also be employed. Aliphatic acids are preferred. The alcohol component for the polyester should preferably contain a plurality of hydroxyl groups and is preferably an aliphatic alcohol, such as ethylene glycol, glycerol, pentaerthritol, trimethylolethane, trimethylolpropane, mannitol, sorbitol, or methyl glucoside. Mixtures of two or more of the above identified alcohols may be employed also if desired. The formation of flexible polyurethane foams is best achieved by using a polyester polyol having an average functionality of from about 2 to about 4 and a molecular weight of from about 2,000 to about 6,000.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide.

The amount of hydroxyl-containing polyol compound to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 1.05 to about 1.5 mol equivalents of isocyanate groups per mol equivalent of hydroxyl groups.

When water is used, the amount of water, based on the hydroxyl compound, is suitably within the range of about 0.01 to 0.1 mol per mol equivalent of hydroxy compound. The exact amount depending on the formulation and the cell structure desired as can readily be determined by those skilled in this art.

It is within the scope of the present invention to utilize added inert blowing agents such as a gas or gas-producing material. For example, halogenated low-boiling hydrocarbons, such as trichloromonofluoromethane and methylene dichloride, carbon dioxide, nitrogen, etc., may be used. The inert blowing agent reduces the amount of excess isocyanate and water that is normally required in preparing flexible urethane foam. Selection of the proper blowing agent is well within the knowledge of those skilled in the art. The total blowing agent (water and/or other) can be from 0.5 to 50 percent by weight based on polyol.

The subject catalysts are employed in an amount of from about 0.05 to about 4.0 weight percent based on the combined weight of the hydroxyl-containing compound and polyisocyanate. More often, the amount of catalyst used is 0.1–1.0 weight percent.

The catalysts of this invention may be used either alone or in a mixture with one or more other catalysts such as other tertiary amines and/or with an organic tin compound or other known polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, and the like wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such other tertiary amines include trialkylamines (e.g. trimethylamine, triethylamine), heterocyclic amines, such as N-alkylmorpholines (e.g., N-methylmorpholine, N-ethylmorpholine, etc.), 1,4-dimethylpiperazine, triethylene-diamine, etc., and aliphatic polyamines, such as N,N,N',N'-tetramethyl-1,3-butanediamine.

In preparing a flexible foam, the ingredients may be simultaneously, intimately mixed with each other by the so-called "one-shot" method to provide a foam by a one-step process. In this instance, water should comprise at least a part (e.g., 10% to 100%) of the blowing agent as conventionally known to those skilled in the art.

In addition to the polyisocyanate, polyol, catalyst and possibly water, the reactants can also have other conventional formulation ingredients, such as blowing agents, foam stabilizing agents, fire retardants, etc. The blowing agent (e.g., a halogenated lower aliphatic hydrocarbon), the foam-stabilizing agent (silicone oils or emulsifiers), the fire retardant, etc., may be added to either the prepolymer or remaining polyol, or both, prior to the mixing of the component, whereby at the end of the reaction a polyurethane foam is provided.

The following examples are given for illustrative purposes only and are not meant to be a limitation on the invention as defined by the appended claims. All parts and percentages are by weight except where indicated otherwise hereinbelow.

EXAMPLE I

Polyol/polyisocyanate compositions containing various tertiary amines selected from amine catalysts of the present invention, other $C_5$ alkyl dimethylamine, and certain amine compounds used commercially as a polyurethane catalyst were tested for gel. According to the procedure published by J. W. Britain and P. G. Gemeinhardt, "Catalysis of Isocyanate-Hydroxy Reaction" in *Journal of Applied Polymer Science*, 4, 207–211 (1960) incorporated herein by reference.

10 parts of each of the polyols listed in Table I below were placed in test containers. Each of the various amines tested was predissolved in dioxane at known concentrations such that 1 part of solution would introduce the desired amount of amine into each of the test containers. The amines were introduced into each polyol, respectively and the test containers were sealed and heated to 70° C. with agitation. The indicated (below) amount of polyisocyante was added to the preheated polyol/catalyst/dioxane solution using a precalibrated syringe. Each test container was agitated after addition of the polyisocyanate, again sealed and replaced in the 70° C. constant temperature bath (approx. 30 sec. to complete). The gel time was measured from the time the test container was returned to the bath. The samples formed with Polyether 490 and MDI (rigid foam components) had a higher isocyanate/polyol ratio and, therefore, the isocyanate was also preheated and the required amount added by weight. The general formulation for each of the series of test samples is given in Table I. Each of the polyol series was run with each of the amines listed in Table II. The first three are representative of the amines of the present invention, the next four representing other dimethyl $C_5$ alkyl amines for comparison. The last two amines listed are commercial products for comparative purposes.

Time of gelation was made by observation and probe.

Table I below lists the components of each series of samples. Each series was formed using (and comparing)

each of the tested amine compounds. The results for each of the amines is given in Table II below.

In the production of polyurethane foams containing water, polyol, polyisocyanate and catalyst, both gelling

TABLE I
COMPOSITIONS OF GEL TEST SAMPLES IN PARTS BY WEIGHT

| | SERIES | | | | | | | | |
|---|---|---|---|---|---|---|---|---|---|
| | I | | II | | III | | IV | | |
| CATALYST LEVEL WT. % | 1% | 2% | 1% | 2% | 1% | 2% | 0.1% | 0.2% | 0.5% |
| POLYETHER 3010 | 10.00 | 10.00 | — | — | — | — | — | — | — |
| POLYETHER 4701 | — | — | 10.00 | 10.00 | — | — | — | — | — |
| POLYESTER 2403 | — | — | — | — | 10.00 | 10.00 | — | — | — |
| POLYETHER 490 | — | — | — | — | — | — | 5.00 | 5.00 | 5.00 |
| CATALYST | 0.10 | 0.20 | 0.10 | 0.20 | 0.10 | 0.20 | 0.0005 | 0.010 | 0.025 |
| DIOXANE | 0.90 | 0.80 | 0.90 | 0.80 | 0.90 | 0.80 | 0.995 | 0.990 | 0.975 |
| TDI | 0.89 | 0.89 | 0.55 | 0.55 | 0.66 | 0.66 | — | — | — |
| MDI | — | — | — | — | — | — | 5.85 | 5.85 | 5.85 |

TABLE II
GELATION TEST RESULTS @ 70° C., MIN.

| | SERIES | | | | | | | | |
|---|---|---|---|---|---|---|---|---|---|
| | I | | II | | III | | IV | | |
| | 1% | 2% | 1% | 2% | 1% | 2% | 0.1% | 0.2% | 0.5% |
| N,N—Dimethyl-n-amylamine | 57 | 32 | 13 | 8 | 6 | 2.5 | 10 | 2 | 1 |
| N,N—Dimethyl-isoamylamine | 60 | 29 | 10 | 11 | 9 | 5 | 9 | 3.5 | 2.5 |
| Isoamyl pyrrolidine | 92 | 47 | 22 | 15 | 10 | 4 | 6 | 3 | 2 |
| N,N—Dimethyl-(2-methylbutyl)amine | >240 | >240 | 120 | 60 | 35 | 16 | 14 | 4 | 2.5 |
| N,N—Dimethyl-(neopentyl)amine | >240 | >240 | >240 | 180 | 130 | 60 | 13 | 8 | 3.5 |
| N,N—Dimethyl-(3-pentyl)amine | >240 | 210 | 92 | >43 | 18 | 8 | 10 | 3 | 2 |
| N,N—Dimethyl-2-methyl-2-butylamine | >240 | >240 | 100 | 48 | 17 | 9 | 9 | 2.5 | 1.5 |
| Bis(2-dimethyl amino ethyl) ether | 60 | 47 | 15 | 11 | 8 | 5 | 6 | 3 | 2 |
| Triethylene diamine | 4 | 2.5 | 2 | 1 | 1 | immed. | 3 | 2 | 1 |

The above gel tests show that the amine catalysts of the present invention are unexpectedly superior to other dimethyl C$_5$ alkyl amines in causing gelation to occur, especially with respect to polyols/polyisocyanates used to form flexible and high resiliency foams. Further, the amine catalysts of the present invention are substantially equivalent to the commercially used bis (2-dimethylamino ethyl) ether. The triethylene diamine was shown to be very reactive and had gel times too short for normal use as sole catalysts while the present catalysts could be so used.

EXAMPLE II

Polyurethane foams were produced using amines of the present invention, other dimethyl C$_5$ alkyl amines (for comparison) and certain commercially used amine catalysts (for comparison). The Gel/Rise profile of each of the formulations was determined according to the method described by R. L. Rowton, *Journal of Cellular Plastics*, 16, 27–35 (1980) which teaching is incorporated herein by reference.

and blowing reactions are occurring simultaneously. Successful preparation of polyurethane foam depends, in part, on a balance of these reactions throughout the foam formation period. If the rise (blowing reaction) dominates, the developing foam may blow itself apart. If, on the other hand, gellation proceeds too fast, the foam will contain closed cells ("tight foam") and tend to shrink. A graphic representation of the gel-rise profile provides a quantitative picture of the extent of gelling and blowing for a particular foam forming composition as a function of time with respect to a particular catalyst system and the results are then comparative among different systems.

Flexible (using Polyether 3010) and high resiliency (using Polyether 4701 and Polyether 34–28) foam formulations were used using conventional, highly regarded amine catalyst systems and using the amine catalysts of the present invention. The formulations (given in parts by weight) and the critical points of each determined gel/rise reaction profile [given in minutes (') and seconds (")] are given in Table III below.

TABLE III
COMPARATIVE DATA FLEXIBLE FOAM FORMULATIONS USING PRESENT VS. COMMERCIALLY ACCEPTED AMINES

| FORMULATION | 1 | 2 | 3 | 4 | 5C | 6C | 7C |
|---|---|---|---|---|---|---|---|
| COMPOSITION (parts) | | | | | | | |
| Polyether 3010 | 100.0 | 100.0 | 100.0 | 100.0 | 100.0 | 100.0 | 100.0 |
| Silicone Surfactant | 1.0 | 1.0 | 1.0 | 1.0 | 1.0 | 1.0 | 1.0 |
| N,N—Dimethyl isoamylamine | 0.1 | 0.14 | — | — | — | — | — |
| N—isoamyl pyrrolidine | — | — | 0.10 | 0.14 | — | — | — |
| BDMAEE | — | — | — | — | 0.1 | — | — |
| BDMAB | — | — | — | — | — | 0.14 | — |
| TEDA | — | — | — | — | — | — | 0.14 |
| Tin Octoate | 0.25 | 0.25 | 0.25 | 0.25 | 0.25 | 0.25 | 0.25 |
| Water | 4.3 | 4.3 | 4.3 | 4.3 | 4.3 | 4.3 | 4.3 |
| TDI | 55.6 | 55.6 | 55.6 | 55.6 | 55.6 | 55.6 | 55.6 |

TABLE III-continued
COMPARATIVE DATA FLEXIBLE FOAM FORMULATIONS USING PRESENT VS. COMMERCIALLY ACCEPTED AMINES

| FORMULATION | 1 | 2 | 3 | 4 | 5C | 6C | 7C |
|---|---|---|---|---|---|---|---|
| Index | 110 | 110 | 110 | 110 | 110 | 110 | 110 |
| CURE RATES (min'sec") | | | | | | | |
| Cream Time | 15" | 12" | 15" | 12" | 8" | 12" | 15" |
| Rise Time (Health Bubbles) | 1'30" | 1'25" | 1'27" | 1'24" | 1'15" | 1'22" | 1'22" |
| Final Rise | 2'40" | 2'20" | 2'20" | 2'20" | 2'00" | 2'20" | 2'10" |
| Final Gel | 2'30" | 2'20" | 2'30" | 2'20" | 2'00" | 2'10" | 2'20" |
| FOAM | | | | | | | |
| Density (lb./cu. ft.) | 1.53 | 1.50 | 1.50 | 1.48 | 1.45 | 1.51 | 1.49 |

TABLE IV
COMPARATIVE DATA FLEXIBLE FOAM FORMULATIONS USING N,N DIMETHYL C$_5$ ALKYL AMINES

| FORMULATION | 1 | 2 | 3C | 4C | 5C |
|---|---|---|---|---|---|
| COMPOSITION | | | | | |
| Polyether 3010 | 100.00 | 100.00 | 100.00 | 100.00 | 100.00 |
| Silicone Surfactant | 1.00 | 1.00 | 1.00 | 1.00 | 1.00 |
| N,N—dimethyl isoamylamine | 0.14 | — | — | — | — |
| N,N—dimethyl-n-amylamine | — | 0.14 | — | — | — |
| TEDA | — | — | 0.14 | — | — |
| N,N—dimethyl-2-methyl-1-butylamine | — | — | — | 0.14 | — |
| N,N—dimethyl-1-neopentylamine | — | — | — | — | 0.14 |
| Water | 4.30 | 4.30 | 4.30 | 4.30 | 4.30 |
| Tin octoate | 0.25 | 0.25 | 0.25 | 0.25 | 0.25 |
| TDI | 55.60 | 55.60 | 55.60 | 55.60 | 55.60 |
| Index | 110.00 | 110.00 | 110.00 | 110.0 | 110.0 |
| CURE RATE (min'sec") | | | | | |
| Cream Time | 15–17" | 15–17" | 15–17" | 16–18" | 20–25" |
| Rise Time | 1'40" | 1'37" | 1"44" | 1'53" | 2'03" |
| Final Rise | 3'00" | 3'00" | 3'10" | 3'10" | 4'00" |
| Final Gel | 3'30" | 3'10" | 3'30" | 4'20" | 4'40" |
| FOAM | | | | | |
| Density (lb./cu. ft.) | 1.55 | 1.53 | 1.53 | 1.56 | 1.59 |

TABLE V
COMPARATIVE DATA HIGH RESILIENCY FOAM FORMULATIONS USING PRESENT VS. COMMERCIALLY ACCEPTED AMINES

| FORMULATION | 1 | 2 | 3 | 4 | 5C | 6C | 7C |
|---|---|---|---|---|---|---|---|
| COMPOSITION | | | | | | | |
| Polyether 4701 | 80.0 | 80.0 | 80.0 | 80.0 | 80.0 | 80.0 | 80.0 |
| Polyether 34-28 | 20.0 | 20.0 | 20.0 | 20.0 | 20.0 | 20.0 | 20.0 |
| Silicon Surfactant | 2.0 | 2.0 | 2.0 | 2.0 | 2.0 | 2.0 | 2.0 |
| Dimetyl isoamylamine | 0.2 | — | 0.8 | — | — | — | — |
| N—isoamyl pyrrolidine | — | 0.2 | — | 0.8 | — | — | — |
| BDMAEE | — | — | — | — | 0.1 | — | — |
| DMAE-DMAP | — | — | — | — | — | 0.2 | — |
| DMEAM | — | — | — | — | — | — | 0.8 |
| TEDA | 0.36 | 0.36 | 0.12 | 0.12 | 0.35 | 0.36 | 0.12 |
| Dibutyltin dilaurate | 0.01 | 0.01 | 0.01 | 0.01 | 0.01 | 0.01 | 0.01 |
| Water | 2.8 | 2.8 | 2.8 | 2.8 | 2.8 | 2.8 | 2.8 |
| TDI/MDI 4:1 | 37.0 | 37.0 | 37.0 | 37.0 | 37.0 | 37.0 | 37.0 |
| Index | 105.0 | 105.0 | 105.0 | 105.0 | 105.0 | 105.0 | 105.0 |
| CURE RATES (min'sec") | | | | | | | |
| Cream Time | 10" | 10" | 8" | 9" | 7" | 8" | 9" |
| Rise Time (Health Bubbles) | 2'43" | 2'35" | 2'27" | 2'35" | 2'40" | 2'28" | 2'50" |
| Final Rise | 2'50" | 2'40" | 2'30" | 2'40" | 2'50" | 2'40" | 2'40" |
| Final Gel | 7'00" | 6'00" | 4'10" | 3'00" | 4'10" | 4'40" | 4'10" |
| FOAM | | | | | | | |
| Density (lb./cu. ft.) | 2.63 | 2.36 | 2.37 | 2.23 | 2.51 | 2.39 | 2.29 |

TABLE VI
COMPARATIVE DATA HR FOAM FORMULATIONS USING N,N—DIMETHYL C$_5$ ALKYL AMINES

| FORMULATION | 1 | 2 | 3C | 4C |
|---|---|---|---|---|
| COMPOSITION | | | | |
| Polyether 11-34 | 60.00 | 60.00 | 60.00 | 60.00 |
| Polyether 34-28 | 40.00 | 40.00 | 40.00 | 40.00 |
| Silicone Surfactant | 2.00 | 2.00 | 2.00 | 2.00 |

TABLE VI-continued
COMPARATIVE DATA HR FOAM FORMULATIONS USING N,N—DIMETHYL C5 ALKYL AMINES

| FORMULATION | 1 | 2 | 3C | 4C |
|---|---|---|---|---|
| TEDA | 0.30 | 0.30 | 0.30 | 0.30 |
| N,N—Dimethyl isoamylamine | 0.80 | — | — | — |
| Dimethyl-n-amylamine | — | 0.80 | — | — |
| Dimethyl-2-methyl-1-butylamine | — | — | 0.80 | — |
| Dimethyl-neo-pentylamine | — | — | — | 0.80 |
| Water | 2.80 | 2.80 | 2.80 | 2.80 |
| Dibutyltin dilaurate | 0.03 | 0.03 | 0.03 | 0.03 |
| TDI/MDI (4:1) | 38.40 | 38.40 | 38.40 | 38.40 |
| INDEX | 110 | 110 | 110 | 110 |
| FOAM | | | | |
| Cure Rates (min'sec") | | | | |
| Cream | 6–8" | 6–8" | 10" | 15–17" |
| Final Rise | 2'50" | 2'50" | 4'00" | 5'40" |
| Final Gel | 3'30" | 3'40" | 7'00" | 9'00" |
| Density (lb./cu. ft.) | 2.08 | 2.15 | 2.18 | 2.22 | nute three component foam machine. Slab stock buns were formed in polyethylene coated molds. The machine operated at a throughput of about 18 lbs/minute. One stream of the machine was stannous octoate as a 10 percent dioxane solution in a portion of the polyether; a second stream contained the TDI; and the third stream contained the remaining components including the amine catalyst. The formulations were the same as those used in Example II above and are referred to by table and sample number hereinbelow. The streams were maintained at ambient temperature (27–30° C.). The foams were post cured for 5 hours at 70° C. Compression set samples were post cured at 85° C. for 12 hours. The physical properties of the resultant foams were tested and compared in Table VII below. The tests were done according to ASTM D-3574-77 with the determination of density by Test A; resilience by Test H; tear by Test F; IFD by Test B-1; and compression by Test C.

TABLE VII
PHYSICAL CHARACTERISTICS OF FOAMS

| PHYSICAL PROPERTIES: | III-2 | | III-4 | | III-5C | | III-6C | | III-7C | |
|---|---|---|---|---|---|---|---|---|---|---|
| Density (pcf) | 1.43 | 1.44 | 1.44 | 1.45 | 1.46 | 1.47 | 1.51 | 1.50 | 1.46 | 1.45 |
| Resilience (%) | 41.00 | 42.00 | 42.00 | 42.00 | 41.00 | 41.00 | 41.00 | 42.00 | 41.00 | 41.00 |
| Tear (pli) | 2.52 | 2.62 | 2.53 | 2.62 | 2.50 | 2.56 | 2.71 | 2.57 | 2.31 | 2.16 |
| Tensile | | | | | | | | | | |
| Break (psi) | 18.00 | 19.90 | 19.70 | 18.00 | 17.20 | 17.20 | 19.10 | 19.30 | 15.60 | 16.20 |
| Elongation (%) | 230.00 | 250.00 | 263.00 | 245.00 | 250.00 | 225.00 | 270.00 | 258.00 | 217.00 | 252.00 |
| ILD (lbs/50 in$^2$): | | | | | | | | | | |
| 25% ILD | 26.60 | 29.70 | 26.30 | 26.30 | 25.50 | 27.70 | 26.00 | 27.50 | 23.80 | 23.40 |
| 65% ILD | 52.30 | 57.60 | 51.90 | 52.00 | 52.10 | 56.70 | 54.00 | 54.40 | 49.20 | 49.30 |
| Support Factor | 1.97 | 1.94 | 1.97 | 1.98 | 2.04 | 2.05 | 2.08 | 1.98 | 2.07 | 2.11 |
| 25% R | 18.30 | 20.30 | 18.60 | 18.10 | 17.40 | 19.50 | 18.00 | 19.00 | 15.60 | 16.00 |
| Recovery Ratio | 68.80 | 68.40 | 70.70 | 68.80 | 68.20 | 70.40 | 69.20 | 69.10 | 65.50 | 68.40 |
| Compression Set (%): | | | | | | | | | | |
| 50% Comp. | 8.40 | 8.50 | 8.70 | 9.30 | 8.90 | 8.90 | 8.70 | 7.70 | 7.90 | 8.10 |
| 75% Comp. | 8.40 | 8.30 | 8.90 | 8.30 | 8.30 | 9.10 | 7.90 | 8.20 | 7.60 | 8.00 |
| 90% Comp. | 8.40 | 10.30 | 11.40 | 10.80 | 11.10 | 10.00 | 8.70 | 8.30 | 9.70 | 8.60 |

The data contained in Tables III–VI above clearly show that the compounds which are the subject of the present invention are unexpectedly superior catalysts for use in forming of polyurethane foams, particularly flexible and high resiliency foams. The data (Tables III and V) clearly show that the compounds which are the subject of the present invention have comparable gel/-rise profiles with respect to various highly used commercial catalyst materials. The amine compounds of the present invention are therefore shown to have suitable catalytic activity and gel/rise profile for forming desired foams. The compounds of the present invention have the distinct advantages over the present commercial catalyst of not imparting an undesirable odor to the product, of being easily formed and of being capable of aiding the economics of producing the desired foams. The data of Tables IV and VI clearly show that the amines of the present invention are unexpectedly superior catalysts to other dimethyl C5 alkyl amines. The gel/rise profile data for each compound show that the tack-free times of formulations formed with the comparative (C) compounds are significantly inferior and not commercially acceptable.

EXAMPLE III

Using commercial foam producing equipment, two samples of flexible foams were prepared having density range of 1.4 to 1.5 pcf using each formulation. The foams were formed using a Martin-Sweets 30 lbs/mi- The data of Table VII show that comparable foam products can be formed using the amine compounds of the present invention in lieu of the comparative (C) commercially accepted amines as catalyst material. The present amines have the advantages of forming foams which do not have undesired odor and the use of an easily formed and, thereby, economical catalyst material.

EXAMPLE IV

The subject compounds, as carboxylate salts, are very useful delayed action catalyst materials and, therefore, are extremely useful in flat-top bun processing wherein all of the components are required to be intermixed prior to application of the mix onto the fall plate of a flat-top bun forming apparatus. Generally, the catalyst material useful in a flat-top bun process must be capable of exhibiting significant delay of the initial time at which foaming and crosslinking reactions occur. This "delayed cream time" is important to permit mixing of the components without formation of the foam. In addition to the required extended cream time, the most preferred catalyst should be capable of altering the gel/rise profile of the polyol/polyisocyanate reaction to make a substantially open-celled foam structure.

The free tertiary amine compounds of the present invention are not only useful in conventional foam processing but can also be used in flat-top processing especially when at least a portion of the amine is in the form of a carboxylate salt. Such salts can be readily formed in any solvent mutual for both the amine and the carboxylic acid, such as acetone, tetrahydrofuran, lower alkyl alcohols and the like, alone or mixed with water. The carboxylic acid, such as, for example, formic, oxalic, adipic, fumaric, 2-ethyl hexanoic acid and the like are mixed with one of the subject amines in molar ratio of up to about 1:1 with from 0.5:1 to 1:1 being preferred.

Further, gel-rise profile studies were done on a number of flexible foam samples formed from using the basic formulation of 100 parts Polyether 3010, 1 part Silicone Surfactant, 3 parts water, 0.2 part Tin Octoate, 41.8 parts TDI (80:20) Index of 110 and each of the studied amine catalysts as shown below. The gel-rise profile was conducted as described in Example II above. The results are given in Table IX below.

TABLE IX
COMPARISON OF PRESENT AMINE/CARBOXYLATE TO COMMERCIAL DELAYED ACTION CATALYST

| Catalyst | Acid | Acid Wt. % Conc. | Cream Time | Rise Time | Final Rise | Gel | Density lbs/cu.ft. | Observations |
|---|---|---|---|---|---|---|---|---|
| Dimethyl isoamylamine | Formic | 0.67 | 13" | 2'05" | 3'40" | 5'30" | 1.93 | Open foam |
| Isoamyl pyrrolidine | Formic | 0.67 | 12" | 1'53" | 4'00" | 3'20" | 1.86 | Open foam |
| Dimethyl isoamylamine | Adipic | 0.63 | 14" | 2'30" | 4'00" | 7'00" | 1.90 | Open foam |
| Isoamyl pyrrolidine | Adipic | 0.71 | 13" | 2'25" | 4'40" | 4'50" | 1.86 | Open foam |
| Triethylene diamine | Formic | 0.4 | 8" | 1'56" | 3'00 | 3'00" | 1.98 | Foam tight/closed cells |
| Bis(2-dimethylamino ethyl) ether | Formic | 0.5 | 14" | 1'47" | 2'50" | 2'00" | 1.85 | Foam slightly tight |
| BDMAEE | Formic | 0.2 | 6" | 1'29" | 2'20" | 2'10" | 1.88 | Foam slightly tight |

The amine carboxylate can be recovered by conventional techniques of evaporation, distillation, etc. or can be used directly in the forming solvent. The resultant catalysts are generally readily soluble in polyols and can be introduced as part of the polyol feed.

Gel tests, as described in Example I above, were performed on a polyol/polyisocyanate composition comprising a polyether polyol of 2000 equivalent weight having about 80 percent primary hydroxyl end groups and 80:20 commercial toluene diisocyanate in stoichiometric ratio with 1 percent concentration of catalyst. The formed amine carboxylates of the present invention were compared to presently accepted commercial delayed action catalysts bis (2-dimethylaminoethyl) ether formate, triethylene diamine formate and triethylene diamine 2-ethyl hexanoate.

TABLE VIII
GEL TESTS OF POLYOL/POLYISOCYANATE AT 70° C. USING DELAYED ACTION CATALYSTS

| CATALYST | Amine/Acid | GEL TIME (min) @ 1.0% |
|---|---|---|
| MIA/Formic Acid | 1/1 | 19 |
| MIA/Formic Acid | 1/0.75 | 19 |
| MIA/Formic Acid | 1/0.5 | 19 |
| MIA/Adipic Acid | 1/0.75 | 26 |
| MIA/Adipic Acid | 1/0.5 | 23 |
| IAP/Adipic Acid | 1/1 | 31 |
| IAP/Adipic Acid | 1/0.75 | 23 |
| MIA/Fumaric Acid | 1/1 | 35 |
| MIA/Fumaric Acid | 1/0.75 | 30 |
| MIA/Fumaric Acid | 1/0.5 | 25 |
| IAP/Fumaric Acid | 1/1 | 45 |
| IAP/Fumaric Acid | 1/0.75 | 35 |
| IAP/Fumaric Acid | 1/0.5 | 30 |
| MIA/2-ethylhexanoic Acid | 1/1 | 43 |
| IAP/2-ethylhexanoic Acid | 1/1 | 39 |
| BDMAEE/Formic Acid | 1/0.5 | 15 |
| Triethylene Diamine/Formic Acid | 1/0.4 | 3 |
| Triethylene Diamine/2-ethyl-hexanoic acid | 1 | 6 |

NOTE:
MIA is N,N—dimethyl-isoamylamine
IAP is N—isoamyl pyrrolidine

The above results show that the present amines perform equally as well or better (longer time to gel) as a delayed action catalyst with respect to commercially accepted materials.

The data of Table IX clearly show that each of the amine/carboxylate materials of the present invention performed as a superior delayed action catalyst in comparison to commercial catalysts (last three catalysts). The present materials each had superior delayed cream time and formed the desired open foam structure while having substantially the same density.

The following glossary is made to define the various materials used in the illustrative examples:

Polyether 3010 is a propylene oxide adduct of glycerol containing secondary hydroxyl groups (1.7 percent) and equivalent weight of about 995 (hydroxyl Number 55) used commercially to form flexible polyurethane foam.

Polyether 4701 is a polyoxypropylene-polyoxyethylene block copolymer triol having 60% primary hydroxyl groups and equivalent weight of about 1650 (hydroxyl Number 34) used commercially to form high resilient polyurethane foams.

Polyester 2403 is a primary hydroxyl containing branched product of adipic acid, diethyleneglycol, glycerol adduct used commercially to form flexible polyurethane foams.

Polyether 490 is a propylene oxide adduct of sorbitol having a hydroxyl equivalent weight of about 115 used commercially to form rigid polyurethane foams.

Polyether 34–28 is a commercial grafted polyol having 20 weight percent styrene/acrylonitrile (1:1) grafted onto a polyether backbone (MW of about 4800) and about 70 percent primary hydroxyl groups (hydroxyl Number 28) to cause the resultant polyol to be trifunctional and have a hydroxyl weight equivalent of about 2000.

Polyether 11–34 is a commercial block copolymer of proplyene oxide and glycerol capped with ethylene oxide having primary hydroxyl content of about 70 percent and equivalent weight of about 2000 (hydroxyl Number 33).

MDI is a commercially available low acidity methylene bis(phenyl isocyanate) having an isocyanate equivalent weight of 135–140 used in forming rigid foams.

TDI is a commercially available 80/20 mixture of ortho-para toluene diisocyanate.

Silicone Surfactant is a commercially available balanced mixture of silixane polyoxyalkylene and dimethylsiloxane.

BDMAEE is a commercial catalyst composed of 70% bis(2-dimethyl aminoethyl) ether in dipropylene glycol TEDA is a commercial catalyst composed of triethylenediamine in dipropylene glycol (33%).

DMAEM is a commercial catalyst composed of N-(dimethylaminoethyl) morpholine.

DMAE-DMAP is a commercial catalyst composed of 2-dimethylaminoethyl-3-dimethylaminopropyl ether.

BDMAB is a commercially available amine catalyst composed of 1,4-bis (dimethylamino) butane.

What is claimed is:

1. A process for forming a polyurethane comprising reacting an organic polyisocyanate with a polyol selected from an organic polyether polyol or polyester polyol in the presence of a catalytic amount of an amine selected from the group having the structural formula:

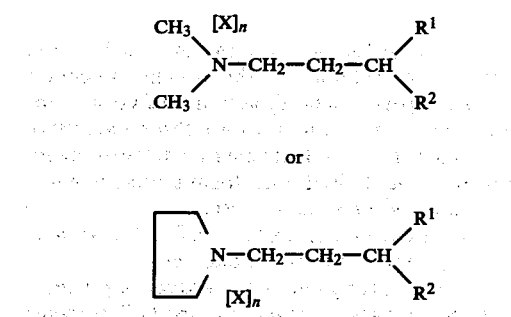

wherein $R^1$ is a methyl or ethyl group and $R^2$ is a hydrogen or methyl group such that when $R^1$ is methyl, $R^2$ is methyl and when $R^1$ is ethyl, $R^2$ is hydrogen, X is an organic mono or dicarboxylic acid and n is a number from 0 to up to 1.

2. The process of claim 1 wherein $R^1$ and $R^2$ are each methyl and n is 0.

3. The process of claim 1 wherein $R^1$ and $R^2$ are each methyl and n is a number up to 1.

4. The process of claim 3 wherein X is selected from formic acid, adipic acid, fumaric acid, 2-ethyl hexanoic acid and mixtures thereof.

5. The process of claim 1 wherein $R^1$ is ethyl, $R^2$ is hydrogen and n is 0.

6. The process of claim 1 wherein $R^1$ is ethyl, $R^2$ is hydrogen and n is a number up to 1.

7. The process of claim 6 wherein X is selected from formic acid, adipic acid, fumaric acid, 2-ethyl hexanoic acid and mixtures thereof.

8. The process of claim 1 wherein the catalyst is present in from about 0.05 to 5 percent by weight based on the weight of polyol present.

9. The process of claim 2 wherein the catalyst is present in from about 0.05 to 5 percent by weight based on the weight of polyol present.

10. The process of claim 4 wherein the catalyst is present in from about 0.05 to 5 percent by weight based on the weight of polyol present.

11. The process of claim 5 wherein the catalyst is present in from about 0.05 to 5 percent by weight based on the weight of polyol present.

12. The process of claim 7 wherein the catalyst is present in from about 0.05 to 5 percent by weight based on the weight of polyol present.

13. The process of claim 1 wherein the reaction is carried out in the presence of from 0.5 to 50 weight percent blowing agent based on weight of polyol.

14. The process of claim 2 wherein the reaction is carried out in the presence of from 0.5 to 50 weight percent blowing agent based on weight of polyol.

15. The process of claim 3 wherein the reaction is carried out in the presence of from 0.5 to 50 weight percent blowing agent based on weight of polyol.

16. The process of claim 5 wherein the reaction is carried out in the presence of from 0.5 to 50 weight percent blowing agent based on weight of polyol.

17. The process of claim 6 wherein the reaction is carried out in the presence of from 0.5 to 50 weight percent blowing agent based on weight of polyol.

18. The process of claim 3 wherein said reaction of polyol and polyisocyanate is carried out in a reaction zone suitable for forming a flat-top bun product.

19. The process of claim 6 wherein said reaction of polyol and polyisocyanate is carried out in a reaction zone suitable for forming a flat-top bun product.

* * * * *

UNITED STATES PATENT AND TRADEMARK OFFICE
CERTIFICATE OF CORRECTION

PATENT NO. : 4,450,246
DATED : May 22, 1984
INVENTOR(S) : Felek Jachimowicz

It is certified that error appears in the above-identified patent and that said Letters Patent is hereby corrected as shown below:

In the "Abstract" change the structural formula from

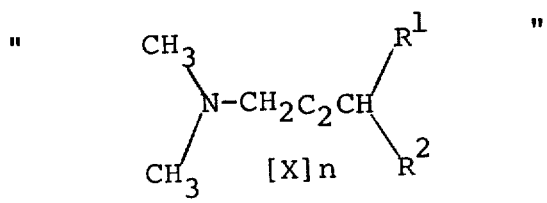

to

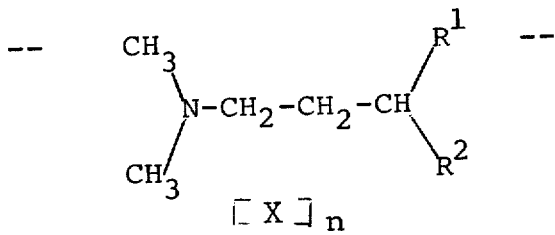

Signed and Sealed this

Twenty-fifth Day of September 1984

[SEAL]

Attest:

GERALD J. MOSSINGHOFF

Attesting Officer

Commissioner of Patents and Trademarks